United States Patent Office 3,356,671
Patented Dec. 5, 1967

3,356,671
PROCESS OF PREPARING UNSYMMETRICAL 1:2-COBALT COMPLEXED AZO COMPOUNDS
Alan Johnson, Peter Albert Mack, and Raymond Price, Manchester, England, assignors to Imperial Chemical Industries Limited, London, England, a corporation of Great Britain
No Drawing. Filed Mar. 17, 1965, Ser. No. 440,641
4 Claims. (Cl. 260—145)

ABSTRACT OF THE DISCLOSURE

Process for producing unsymmetrical 1:2-cobalt complexes containing one atom of cobalt in complex union with two different metallisable azo compounds by reacting a 1:1-cobalt complex of the formula

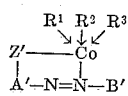

with a metallisable azo compound of the formula

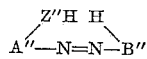

to form said 1:2-cobalt complex having the formula

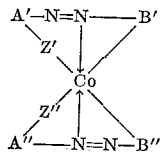

wherein A' and A" each independently represent phenylene or naphthalene radicals; Z' and Z", which are attached to A' and A", respectively, in orthoposition to the azo group, independently represent —O— or —COO—; B' and B" each independently represent radicals of coupling components selected from the group consisting of phenol, naphthol, acylacetarylamide or 5-pyrazolone series, the cobalt being attached to B' and B" through the oxygen atoms which are situated in orthoposition to the coupling position; $R^1$, $R^2$ and $R^3$ each independently represent a molecule of ammonia or a primary, secondary or tertiary monoamine; and wherein at least one of A', B' and Z' is not identical with A", B" and Z". The reaction is carried out at a pH between 7.0 and 9.0.

This invention relates to a manufacturing process and more particularly it relates to an improved process for the manufacture of 1:2-cobalt complexes of metallisable azo compounds.

Although unsymmetrical 1:2-cobalt complexes formed from 1 atom of cobalt with a molecule of each of two different metallisable azo compounds have previously been described, the only method described for the preparation of such complexes has involved treating a mixture of two different metallisable azo compounds with a cobalting agent. However this method results in the formation of a mixture of complexes since not only is the required unsymmetrical complex obtained but there are also obtained the two symmetrical complexes containing 1 atom of cobalt in complex union with two molecular proportions of the same metallisable azo compound.

It has now been found that unsymmetrical 1:2-cobalt complexes containing 1 atom of cobalt in complex union with two different metallisable azo compounds can be readily obtained in a pure state free from the presence of undesirable symmetrical complexes.

According to the invention there is provided an improved process for the manufacture of the 1:2-cobalt complexes which are represented by the formula:

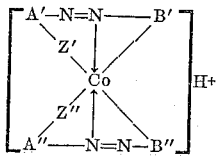

wherein A' and A" each independently represent phenylene or naphthylene radicals which may contain further substituents; Z' and Z", which are attached to A' and A" respectively, in ortho position to the azo group, each independently represent —O— or —COO—; B' and B" each independently represent the radicals of coupling components which couple in ortho position to a hydroxy group or in vicinal position to an enolised keto group, the cobalt atom being attached to B' and B" through the oxygen atoms which are in ortho or vicinal position to the coupling positions, provided that at least one of A', B' and Z' is not identical with A", B" and Z" respectively, which comprises reacting a 1:1-cobalt complex of the formula:

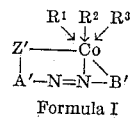

Formula I wherein $R^1$, $R^2$ and $R^3$ each independently represent a molecule of ammonia or of a primary, secondary or tertiary monoamine, the coordinate bonds which link the cobalt atom to the molecules of ammonia or the said amine being bonded to the nitrogen atoms present in the ammonia or amines with a metallisable azo compound of the formula:

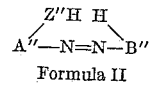

Formula II wherein A', A", B', B", Z' and Z" have the meanings stated.

The process of the invention can be conveniently carried out by stirring the reactants together in water, or in an organic liquid which is preferably a water-soluble organic liquid, or in a mixture of water and a water-miscible organic liquid, preferably at a temperature between 20° C. and the boiling point of the medium in which the reaction is being carried out. The resulting 1:2-cobalt complex can then be isolated by conventional means, for example by adding sodium chloride to precipitate the complex which is then filtered off.

The process of the invention is preferably carried out under mildly alkaline conditions, for example at a pH between 7.0 and 9.0, by adding an alkali or an alkaline salt such as sodium carbonate or disodium hydrogen phosphate.

As examples of water-soluble organic liquids there may be mentioned ethanol, acetone, formamide, dioxan and β-ethoxyethanol.

In some cases it is advantageous to add a catalyst such as active carbon to ensure that the reaction proceeds to completion.

As examples of additional substituents which may be present in the phenylene or naphthylene radicals represented by A' and A", and which may also be present in the coupling components B' and B", preferably attached to phenyl or naphthyl radicals present in the said coupling components, there may be mentioned chlorine or bromine atoms; or lower alkyl in particular methyl; lower alkoxy in particular methoxy; nitro; cyano; lower alkylsulphone such as methylsulphone and ethylsulphone:

hydroxy lower alkylsulphone such as hydroxyethylsulphone; carboxylic acid; sulphonic acid; amino; substituted amino such as phenylamino, sulphophenylamino and N-lower alkylamino for example methylamino and dimethylamino; sulphonamide; substituted sulphonamide such as N-lower alkyl and N-(hydroxy lower alkyl)sulphonamide for example N-methylsulphonamide, N:N-dimethylsulphonamide, N-β-hydroxyethylsulphonamide and N:N-di(β-hydroxyethyl)sulphonamide; and acylamino groups such as formylamino, acetylamino, benzoylamino, benzenesulphonylamino, carbomethoxyamino and carboethoxyamino groups.

Throughout this specification the terms "lower alkyl" and "lower alkoxy" are used to denote alkyl and alkoxy radicals respectively containing from 1 to 4 carbon atoms.

The 1:1-cobalt complexes of Formula I may themselves be obtained by reacting a metallisable azo compound of the formula

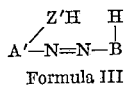

Formula III with a cobaltous complex of a cobaltous salt with ammonia or with a primary, secondary or tertiary monoamine, the reaction being performed in aqueous medium or in a mixture of water and a water-miscible organic liquid, and preferably in an inert atmosphere.

The said cobaltous complex of a cobaltous salt can be obtained by treating a cobaltous salt, such as cobaltous acetate, chloride, sulphate or nitrate, with ammonia or with the said amine, preferably in an inert atmosphere.

As examples of the said primary, secondary or tertiary monoamines there may be mentioned primary and secondary alkylamines such as methylamine, dimethylamine, ethylamine, diethylamine, di-n-propylamine, n-propylamine, iso-propylamine and n-butylamine; aromatic primary and secondary monoamines in particular monoamines of the benzene and naphthalene series such as aniline, N-methylaniline, p-toluidine, α-naphthylamino and p-anisidine; and heterocyclic compounds containing a secondary or tertiary nitrogen atom as part of the heterocyclic ring such as pyridine, piperidine, isoquinoline, quinoline, β-picoline, morpholine and γ-picoline. It is however preferred to use ammonia.

The metallisable azo compounds of Formulae II and III may themselves be obtained by coupling a diazotised primary amine of the benzene or naphthalene series which contain a hydroxy or carboxy group in ortho position to the amino group with a coupling component which couples in ortho position to a hydroxy group or in vicinal position to an enolised or enolisable keto group.

The said coupling components may be members of any of the known series of coupling components which couple in ortho position to a hydroxy group or in vicinal position to an enolised or enolisable keto group, but preferably they are coupling components of the phenol, naphthol, acylacetarylamide or 5-pyrazolone, in particular 1-aryl-5-pyrazolone series.

As specific examples of the said primary amines there may be mentioned 2-aminophenol,
4- or 5-nitro-2-aminophenol,
4- or 5-chloro-2-aminophenol,
4-chloro-5-nitro-2-aminophenol,
4-chloro-2-aminophenol-6-sulphonic acid,
6-chloro-2-aminophenol-4-sulphonic acid,
4-nitro-2-aminophenol-6-sulphonic acid,
6-nitro-2-aminophenol-4-sulphonic acid,
2-aminophenol-4:6-disulphonic acid,
4:6-dinitro-2-aminophenol,
2-aminophenol-4-sulphon-N-β-hydroxyethylamide,
2-aminophenol-4-β-hydroxyethylsulphone,
6-acetylamino-2-aminophenol-4-sulphonic acid,
4-acetylamino-2-aminophenol-6-sulphonic acid,
4-methyl-2-aminophenol,
4-methoxy-2-aminophenol,
2-aminophenol-4-sulphon-N-methylamide,
2-aminophenol-5-sulphonamide,
4-chloro-2-aminophenol-5- or 6-sulphonamide,
2-aminophenol-4-sulphon-N:N-dimethylamide,
2-aminophenol-4-methylsulphone,
2-aminophenol-4-ethylsulphone,
anthranilic acid,
2-amino-3-naphthoic acid,
4- or 5-chloro-anthranilic acid,
4- or 5-nitroanthranilic acid,
4- or 5-acetylamino-anthranilic acid,
4- or 5-sulphoanthranilic acid,
anthranilic acid 4-sulphonamide,
anthranilic acid 4- or 5-β-hydroxyethylsulphone,
anthranilic acid 4- or 5-ethylsulphone,
4- or 5-benzoylaminoanthranilic acid,
3:3'-dihydroxy-4:4'-diaminodiphenyl,
2-amino-1-naphthol-4:8-disulphonic acid,
2-amino-2-naphthol-4-sulphonic acid,
1-amino-2-naphthol-4-sulphonic acid,
1-amino-2-naphthol-4-sulphonamide,
2-aminophenol-4- or 5-sulphonic acid,
6-nitro-1-amino-2-naphthol-4-sulphonic acid,
6-acetylamino-1-amino-2-naphthol-4-sulphonic acid, and
2-(3'-sulphoanilino)-7-(2''-hydroxy-4''-sulpho-6''-aminophenylazo)-8-naphthol-6-sulphonic acid.

As specific examples of the said coupling components there may be mentioned phenols such as p-cresol,
3:4-dimethylphenol,
2:4-dimethylphenol,
2- or 3-acetylamino-4-methylphenol,
4-t-butylphenol,
2-hydroxy-5:6:7:8-tetrahydronaphthalene,
2-hydroxy-3-sulphonic acid-5:6:7:8-tetrahydronaphthalene,
2-carboethoxyamino-4-methylphenol,
resorcinol,
m-aminophenol,
2:4-dihydroxyacetophenone,
2:4-dihydroxyazobenzene,
2:4-dihydroxyazobenzene-2'- or 4'-sulphonic acid,
2:4-dihydroxyazobenzene-2':5'-disulphonic acid,
2:4-dihydroxy-4'-nitroazobenzene,
2:2':4-trihydroxyazobenzene-3':5'-disulphonic acid,
2:4-dihydroxy-4'- or -5'-(acetylamino)azobenzene-2'-sulphonic acid and
4-(2'':4''-dihydroxyphenylazo-4'-nitrostilbene-2:2'-disulphonic acid;
naphthols such as
2-naphthol,
1:3- or 1:5-dihydroxynaphthalene,
2-naphthol-6-sulphonic acid,
1:8-dihydroxynaphthalene-3:6-disulphonic acid,
1:3-dihydroxynaphthalene-5-, 6- or 7-sulphonic acid,
1:3-dihydroxynaphthalene-5:7-disulphonic acid,
2-naphthol-6-sulphonamide,
2-naphthol-6-β-hydroxyethylsulphone,
1-amino-4-naphthol,
2-amino-6-naphthol,
1-amino-7-naphthol,
1-acetylamino-4-naphthol,
1-acetylamino-7-naphthol,
1-propionylamino-7-naphthol,
1-carbomethoxyamino-7-naphthol,
1-carboethoxyamino-7-naphthol,
1-carbopropoxyamino-7-naphthol,
2-amino-5-naphthol-7-sulphonic acid,
2-amino-5-naphthol-1:7-disulphonic acid,
2-acetylamino-5-naphthol-7-sulphonic acid,
2-benzoylamino-5-naphthol-7-sulphonic acid,
2-phenylamino-5-naphthol-7-sulphonic acid, 2-(3'-sulphoanilino)-5-naphthol-7-sulphonic acid,
2-amino-8-naphthol-6-sulphonic acid,
2-acetylamino-8-naphthol-6-sulphonic acid,
2-(3'-or 4'-aminobenzoylamino)-5-naphthol-7-sulphonic acid,
2-(3'- or 4'-aminobenzoylamino)-8-naphthol-6-sulphonic acid,
1-(3'- or 4'-amino-benzoylamino)-8-naphthol-3:6-disulphonic acid,
2-(3'- or 4'-aminoanilino)-5-naphthol-7-sulphonic acid,
2-(3'- or 4'-aminoanilino)-8-naphthol-6-sulphonic acid,
1-(3'- or 4'-aminoanilino)-8-naphthol-3:6-disulphonic acid,
2-(3'-amino-4'-sulphonanilino)-5-naphthol-7-sulphonic acid,
2-phenylamino-8-naphthol-3:6-disulphonic acid,
2-(4'-amino-3'-sulphonanilino)-5-naphthol-7-sulphonic acid,
2-(4'-amino-3'-sulphoanilino)-8-naphthol-6-sulphonic acid,
1-amino-8-naphthol-3:6-, -2:4- or -4:6-disulphonic acid,
1-amino-8-naphthol-4-sulphonic acid,
1-amino-5-naphthol-7-sulphonic acid,
1-acetylamino-8-naphthol-3:6- or -4:6- disulphonic acid,
1-benzoylamino-8-naphthol-3:6- or -4:6-disulphonic acid,
1-phenylamino-8-naphthol-3:6- or -4:6-disulphonic acid,
1-naphthol-4-sulphonic acid,
1-naphthol-4:6-disulphonic acid,
2-naphthol-6:8-disulphonic acid,
1-naphthol-5-sulphonic acid,
2-naphthol-3:6-disulphonic acid,
2-naphthol-3:6:8-trisulphonic acid,
1-amino-8-naphthol-4-sulphonic acid,
2-amino-8-naphthol-3:6-disulphonic acid,
6-acetyl-2-naphthol,
4-acetyl-2-naphthol,
4-acetyl-1-naphthol,
1-naphthol-3-, -4- or 5-sulphonamide,
2-naphthol-3-, -4-, -5-, -6-, -7- or -8-sulphonamide,
5:8-dichlor-1-naphthol,
2-methylamino-5-naphthol-7-sulphonic acid,
2-methylamino-8-naphthol-6-sulphonic acid,
1-butylamino-8-naphthol-3:6-disulphonic acid,
1-naphthol-3:6-8-trisulphonic acid,
6-β-hydroxyethylsulphonyl-2-naphthol-3-sulphonic acid,
1-naphthol-3:6- or 3:8-disulphonic acid,
2-(4'-nitrophenylazo)-1-amino-8-naphthol-3:6-disulphonic acid,
2-(2'- or 4'-sulphophenylazo)-1-amino-8-naphthol-3:6-disulphonic acid,
2-(2':5'-disulphophenylazo)-1-amino-8-naphthol-3:6-disulphonic acid, and
2-naphthol-7- or -8-sulphonic acid;

heterocyclic components such as barbituric acid and 2:4-dihydroxyquinoline; 5-pyrazolones such as 1:3-dimethyl-5-pyrazolone, but more particularly 1-aryl-5-pyrazolones such as 1-phenyl-3-methyl-5-pyrazolones,
1-(2'- or 3'- or 4'-methylphenyl)-3-methyl-5-pyrazolone,
1-(2'- 3'- or 4'-sulphophenyl)-3-methyl-5-pyrazolone,
1-[3'- or 4'-(β-hydroxyethylsulphonyl)phenyl]-3-methyl-5-pyrazolone,
1-phenyl-3-carboxy-5-pyrazolone,
1-(3'- or 4'-aminophenyl)-3-methyl-5-pyrazolone,
1-(2'-methoxyphenyl)-3-methyl-5-pyrazolone,
1-(2'-, 3'- or 4'-chlorophenyl)-3-methyl-5-pyrazolone,
1-(3'- or 4'-aminophenyl)-3-carboxy-5-pyrazolone,
1-(3'-amino-4'-sulphophenyl)-3-(carboxy or methyl)-5-pyrazolone,
1-(4'-amino-3'-sulphophenyl)-3-(carboxy or methyl)-5-pyrazolone,
1-(2'-, 3'- or 4'-nitrophenyl)-3-methyl-5-pyrazolone,
1-(2':5'- or 3':4'-dichlorophenyl)-3-methyl-5-pyrazolone,
1-(2'-, 3' or 4'-sulphamylphenyl)-3-methyl-5-pyrazolone,
1-(2'-, 3'- or 4'-methylsulphonylphenyl)-3-methyl-5-pyrazolone,
1-phenyl-5-pyrazolone-3-carboxycresidide,
1-phenyl-5-pyrazolone-3-carboxy-2'-toluidide,
1-phenyl-5-pyrazolone-3-carboxyanilide,
1:3-diphenyl-5-pyrazolone, 1-(2'-, 3'- or 4'-N-methylsulphamylphenyl)-3-methyl-5-pyrazolone,
1-(6'-chloro-3'-methyl-4'-sulphophenyl)-3-methyl-5-pyrazolone,
1-(2':5'-dichloro-4'-sulphophenyl)-3-methyl-5-pyrazolone,
1-(2'-methyl-5'-sulphophenyl)-3-methyl-5-pyrazolone,
1-(4'-chloro-2'-sulphophenyl)-3-methyl-5-pyrazolone,
1-(6'-chloro-4'-sulpho-2'-methylphenyl)-3-carboethoxy-5-pyrazolone,
1-(2':5'-disulphophenyl)-3-methyl-5-pyrazolone,
1-(4'-sulphophenyl)-3-carboxy-5-pyrazolone,
1-(2'-, 3'- or 4'-carboxyphenyl)-3-methyl-5-pyrazolone,
1-(6-chloro-4'-sulpho-2'-methylphenyl)-3-methyl-5-pyrazolone and 3-carboxy-5-pyrazolone and acylacetarylamides in particular acetoacetanilides and benzoylacetanilides such as acetoacet-4-(β-hydroxyethylsulphonyl)-anilide,
acetoacet-o-anisidide,
acetoacet-o-toluidide,
acetoocet-o-chloranilide,
acetoacetanilide-3- or -4-sulphonic acid,
acetoacet-3- or 4-aminoanilide,
acetoacet-m-xylidide,
acetoacetanilide-2-, -3- or -4-carboxylic acid,
benzoylacetanilide-3- or -4-sulphonic acid,
benzoylacet-3- or -4-aminoanilide and
acetoacetanilide-4-sulphonamide.

A preferred class of 1:2-cobalt complexes obtained by the process of the invention are those complexes which contain a single sulphonic acid group attached to one of the radicals represented by A', A'', B' and B''.

The 1:2-cobalt complexes obtained by the process of the invention are valuable as intermediates in the production of other cobalt-containing azo dyestuffs, for example they can be converted to reactive dyestuffs by the introduction, by standard known methods, of reactive groups. The 1:2-cobalt complexes are also valuable in their own right as dyestuffs for textile materials such as cellulose textile materials, aromatic polyester textile materials, cellulose acetate textile materials, polyacrylonitrile textile materials, but more especially synthetic polyamide textile materials such as textile materials comprising polyhexamethyleneadipamide and polymers from caprolactam, and preferably natural polyamide textile materials such as woollen textile materials, and also leather.

The 1:2-cobalt complexes can be applied to textile materials by any of the processes known for applying such complexes to textile materials. Thus, for example, the textile materials can be dyed in a dyebath comprising an aqueous solution or suspension of one or more of the said complexes. If desired the dyebath can contain the usual additives such as organic acids, for example formic acid or acetic acid, neutral electrolytes such as sodium chloride or sodium sulphate, and cationic, anionic and/or non-ionic surface-active agents.

When applied to polyamide textile materials the 1:2-cobalt complexes obtained by the process of the invention have excellent build-up properties and yield level yellow to black colourations possessing excellent fastness to light and to wet treatments such as washing, potting, milling and cross-dyeing.

The invention is illustrated but not limited by the following examples in which the parts are by weight.

*Example 1*

A mixture of 22.35 parts of the 1:1-cobalt complex of 1-phenyl-3-methyl-4-(2'-hydroxy-5' - nitrophenylazo) - 5-pyrazolone containing coordinated ammonia molecules, 21.95 parts of 1-(2'-hydroxy-4'-sulpho-6'-nitronaphth-1'-ylazo)-2-naphthol, 500 parts of water and 1000 parts of formamide is adjusted to a pH of 8.0 by the addition of sodium carbonate, and the mixture is then stirred at 60° C. for 1 hour. The mixture is filtered, the resulting filtrate is poured into a solution of 1000 parts of sodium chloride in 4500 parts of water, and the precipitated solid is filtered off, washed with an aqueous solution of sodium chloride and dried.

The compound so obtained consists of the 1:2-cobalt complex of the formula:

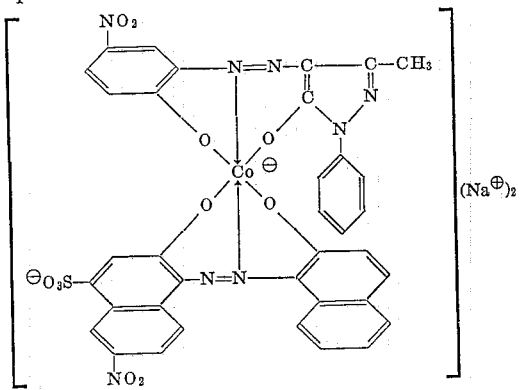

When applied to wool from a neutral or slightly acid dyebath the complex yields reddish-brown shades possessing excellent fastness to light and to wet treatments.

The 1:1-complex used in the above example was itself obtained as follows:

30.9 parts of cobaltous sulphate hexahydrate were added to a stirred mixture of 33.9 parts of 1-phenyl-3-methyl-4-(2'-hydroxy-5'-nitrophenylazo)-5-pyrazolone, 150 parts of water and 200 parts of an aqueous solution of ammonium hydroxide of specific gravity 0.89, and the resulting mixture was stirred at 15° C. for 20 hours. The precipitated 1:1-cobalt complex was then filtered off, washed with water and dried.

*Example 2*

In place of the 21.95 parts of 1-(2'-hydroxy-4'-sulpho-6'-nitronaphth-1'-ylazo-2-naphthol used in Example 1 there are used 20.2 parts of 2-amino-7-(2'-hydroxy-5'-nitrophenylazo)-8-naphthol-6-sulphonic acid whereby a product is obtained which consists essentially of the 1:2-cobalt complex of the formula:

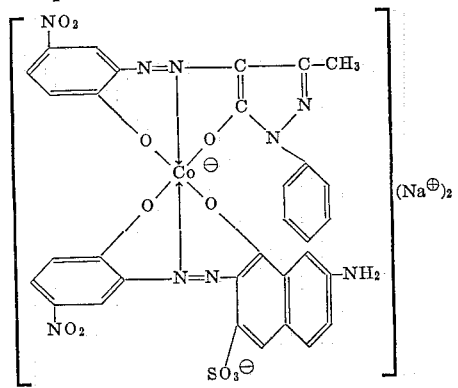

When this complex is reacted with acryloyl chloride in aqueous medium the corresponding N-acryloyl derivative is obtained, which when applied to woollen textile materials from a neutral or slightly acid dyebath yields dark brown shades possessing excellent fastness to wet treatments.

*Example 3*

A mixture of 21.8 parts of the 1:1-cobalt complex of 1-phenyl-3-methyl-4-(2'-hydroxy-5'-chlorophenylazo)-5-pyrazolone containing coordinated molecules of ammonia, 21.15 parts of 1-(4'-aminophenyl)-3-methyl-4-(2''-hydroxy-3-sulpho-5''-chlorophenylazo)-5-pyrazolone, 5 parts of active carbon, 500 parts of water and 1000 parts of formamide is adjusted to a pH of 8.0 by the addition of sodium carbonate, and the mixture is then stirred for 15 minutes at 80° C. The mixture is filtered, and the resulting filtrate poured into a solution of 1000 parts of sodium chloride in 4500 parts of water. The precipitated cobalt complex is then filtered off, washed with an aqueous solution of sodium chloride and dried.

The compound so obtained consists of the 1:2-cobalt complex of the formula:

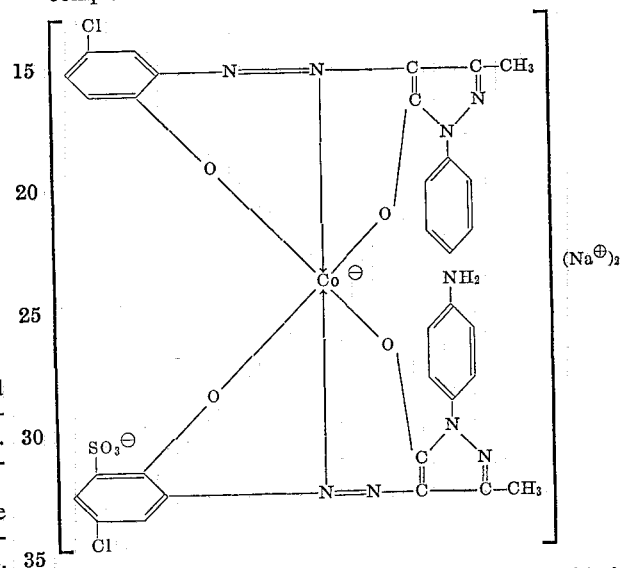

When the complex is reacted with acryloyl chloride in aqueous medium the corresponding N-acryloyl derivative is obtained, which, when applied to woollen textile materials from a neutral or slightly acid dyebath, yields orange shades possessing excellent fastness to light and to wet treatments.

The 1:1-cobalt complex used in the above example was itself obtained by stirring, for 20 hours at 15° C., a mixture of 1-phenyl-3-methyl-4-(2'-hydroxy-5'-chlorophenylazo)-5-pyrazolone, cobaltous sulphate, an aqueous solution of ammonium hydroxide and formamide in an inert atmosphere, and filtering off the 1:1-cobalt complex which was precipitated.

*Example 4*

In place of the 22.35 parts of the 1:1-cobalt complex used in Example 1 there are used 19.25 parts of the 1:1-cobalt complex of 1-(2'-hydroxy-5'-nitrophenylazo)-2-naphthol containing coordinated ammonia molecules whereby there is obtained the 1:2-cobalt complex of the formula:

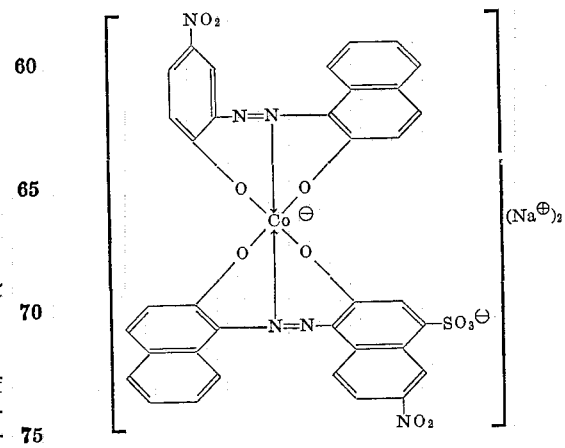

When applied to woolen textile materials from a neutral or slightly acid dyebath the complex yields reddish-brown shades possessing excellent fastness to light and to wet treatments.

The 1:1-cobalt complex used in this example was obtained by the method given in Example 1 for the preparation of the 1:1-cobalt complex except that the 33.9 parts of 1 - phenyl - 3 - methyl - 4 - (2' - hydroxy - 5'-nitrophenylazo)-5-pyrazolone were replaced by an equivalent amount of 1 - (2' - hydroxy - 5' - nitrophenylazo)-2-naphthol.

The table above gives further examples which further illustrate the process of the invention for the production of 1:2-cobalt complexes of matallisable azo dyestuffs. In this table the 1:1-cobalt complexes of the metallisable azo compounds listed in the second column of the table and containing coordinated molecules of the amines listed in the third column of the table, the said 1:1-cobalt complexes being themselves obtained by reacting the metallisable azo compounds listed in the second column of the table with cobaltous sulphate in the presence of the amines listed in the third column of the table, are reacted with the metallisable azo compounds listed in the fourth column of the table by methods similar to those described in the previous examples.

The fifth column of the table indicates the shades obtained when the resulting complexes containing 1 atom of cobalt bound in complex formation with one molecular proportion of each of the metallisable azo compounds listed in columns 2 and 4 of the table are applied to textile materials.

| Ex. | 1:1-Cobalt complex of— | Amine | Metallisable Azo Compound | Shade |
|---|---|---|---|---|
| 5 | 1-(m-aminophenyl)-3-carboxy-4-(2'-hydroxy-5'-sulphophenylazo)-5-pyrazolone. | Ammonia | 2-amino-6-(2'-hydroxy-3'-sulpho-5'-nitrophenylazo)-5-naphthol-1:7-disulphonic acid. | Reddish-brown. |
| 6 | ----do---- | ----do---- | 2-amino-7-(2'-hydroxy-3'-sulpho-5'-nitrophenylazo)-8-naphthol-6-sulphonic acid. | Do. |
| 7 | 1-(m-aminophenyl)-3-methyl-4-(2'-hydroxy-5'-sulphophenylazo)-5-pyrazolone. | ----do---- | ----do---- | Brown. |
| 8 | ----do---- | ----do---- | 1-amino-7-(2'-hydroxy-5'-nitrophenylazo)-8-naphthol-3:6-disulphonic acid. | Greyish-green. |
| 9 | 1-(p-sulphophenyl)-3-methyl-4-(2'-hydroxy-5'-sulphophenylazo)-5-pyrazolone. | ----do---- | 1-amino-7-(2'-hydroxy-3'-sulpho-5'-nitrophenylazo)-8-naphthol-3:6-disulphonic acid. | Do. |
| 10 | ----do---- | ----do---- | 2-amino-6-(o-carboxyphenylazo)-5-naphthol-7-sulphonic acid. | Brown. |
| 11 | ----do---- | ----do---- | 1-(p-sulphophenyl)-3-methyl-4-(2'-hydroxy-3':5'-disulphophenylazo)-5-pyrazolone. | Orange. |
| 12 | 1-amino-7-(2'-hydroxy-5'-nitrophenylazo)-8-naphthol-3:6-disulphonic acid. | ----do---- | 1-amino-7-(o-carboxyphenylazo)-8-naphthol-3:6-disulphonic acid. | Blue. |
| 13 | ----do---- | ----do---- | ----do---- | Do. |
| 14 | ----do---- | ----do---- | 2-amino-7-(2'-hydroxy-3'-chloro-5'-sulphophenylazo)-8-naphthol-6-sulphonic acid. | Violet. |
| 15 | ----do---- | ----do---- | 2-amino-6-(2'-carboxyphenylazo)-naphthol-7-sulphonic acid. | Grey. |
| 16 | 1-(p-sulphophenyl)-3-methyl-4-(2'-hydroxy-3':5'-disulphophenylazo)-5-pyrazolone. | ----do---- | 1-(p-sulphophenyl)-3-methyl-4-(o-carboxyphenylazo)-5-pyrazolone. | Brown. |
| 17 | 1-amino-7-(o-carboxyphenylazo)-8-naphthol-3:6-disulphonic acid. | ----do---- | ----do---- | Grey. |
| 18 | α-(2'-hydroxy-3':5'-disulphophenyl-azo)-β-keto-N-phenyl-n-butyramide. | ----do---- | 2-amino-6-(o-carboxyphenylazo)-5-naphthol-7-sulphonic acid. | Brown. |
| 19 | ----do---- | ----do---- | 1-amino-7-(2'-hydroxy-3'-sulpho-5'-nitrophenylazo)-8-naphthol-3:6-disulphonic acid. | Green. |
| 20 | ----do---- | ----do---- | 1-(p-sulphophenyl)-3-methyl-4-(2'-hydroxy-5'-sulphophenylazo)-5-pyrazolone. | Reddish-yellow. |
| 21 | α-(2'-hydroxyphenylazo)-β-keto-N-phenyl-n-butyramide. | Pyridine | 1-(p-aminophenyl)-3-methyl-4-(2'-hydroxy-3'-sulpho-5'-chlorophenylazo)-5-pyrazolone. | Do. |
| 22 | 1-phenyl-3-methyl-4-(2'-hydroxy-5'-nitrophenylazo)-5-pyrazolone. | Methylamine | 1-(2'-hydroxy-4'-sulpho-6'-nitronaphth-1-ylazo)-2-naphthol. | Reddish-brown. |
| 23 | α-(2'-hydroxy-5'-chlorophenylazo)-β-keto-N-phenyl-n-butyramide. | Ammonia | α-(2'-hydroxy-5'-sulphophenylazo)-β-keto-N-phenyl-n-butyramide. | Yellow. |
| 24 | ----do---- | ----do---- | α-(2'-hydroxy-3'-chloro-5-sulphophenylazo)-β-keto-N-phenyl-n-butyramide. | Do. |
| 25 | ----do---- | ----do---- | 1-phenyl-3-methyl-4-(2'-hydroxy-5'-sulphophenyl-azo)-5-pyrazolone. | Brownish-yellow. |
| 26 | 1-(2'-hydroxy-4'-nitrophenylazo)-2-naphthol. | ----do---- | 2-acetylamino-6-(2'-hydroxy-4'-nitrophenylazo)-5-naphthol-7-sulphonic acid. | Navy-Blue. |
| 27 | ----do---- | | 2-acetylamino-7-(2'-hydroxy-4'-nitrophenylazo)-8-naphthol-6-sulphonic acid. | Do. |
| 28 | 1-phenyl-3-methyl-4-(2'-hydroxy-4'-nitrophenylazo)-5-pyrazolone. | Ammonia | 2-acetylamino-6-(o-carboxyphenylazo)-5-naphthol-7-sulphonic acid. | Orange. |
| 29 | ----do---- | ----do---- | α-(2'-hydroxy-3'-sulpho-5'-chlorophenylazo)-β-keto-N-phenyl-n-butyramide. | Do. |
| 30 | 1-[2'-hydroxy-3'-(3''-sulphamylphenylazo)-5'-methylphenylazo]-2-naphthol. | ----do---- | 1-acetylamino-8-(2'-hydroxy-4'-nitrophenylazo)-7-naphthol. | Blue. |
| 31 | ----do---- | ----do---- | 1-[2'-hydroxy-5'-(3''-sulphamylphenylazo)-phenylazo]-2-naphthol. | Brown. |
| 32 | 1-[2'-hydroxy-5'-(3''-sulphamylphenylazo)phenyl-azo]-2-naphthol. | ----do---- | 1-[2'-hydroxy-4'-nitro-5'-chlorophenylazo)-2-naphthol. | Blue. |
| 33 | α-(2'-hydroxy-5'-sulphophenylazo)-β-keto-N-phenyl-n-butyramide. | ----do---- | 1-[2'-hydroxy-3'-(3''-sulphamylphenylazo)-5'-methylphenylazo]-2-naphthol. | Yellowish-brown. |
| 34 | 1-phenyl-3-methyl-4-(2'-hydroxy-5'-nitrophenyl-azo)-5-pyrazolone. | ----do---- | 2:2'-dihydroxy-5'-methylazobenzene-5-sulphonic acid. | Do. |
| 35 | 1-phenyl-3-methyl-4-(2'-hydroxy-5'-chlorophenyl-azo)-5-pyrazolone. | ----do---- | 2:2'-dihydroxy-5'-methyl-5-chloroazobenzene-5'-sulphonic acid. | Brown. |
| 36 | α-(2'-hydroxyphenylazo)-β-keto-N-phenyl-n-butyramide. | Methylamine | 1-(4'-aminophenyl)-3-methyl-4-(2''-hydroxy-5'-chloro-3'-sulphophenylazo)-5-pyrazolone. | Reddish-yellow. |
| 37 | ----do---- | ----do---- | 2:2'-dihydroxy-5-methylazobenzene-5'-sulphonic acid. | Yellowish-brown. |
| 38 | 1-phenyl-3-methyl-4-(2'-hydroxy-5'-chlorophenyl-azo)-5-pyrazolone. | ----do---- | 1-(4'-aminophenyl)-3-methyl-4-(2''-hydroxy-5''-chloro-3''-sulphophenylazo)-5-pyrazolone. | Orange. |
| 39 | 1-phenyl-3-methyl-4-(2'-hydroxy-5'-nitrophenyl-azo)-5-pyrazolone. | Dimethylamine | 1-(2'-hydroxy-6'-nitro-4'-sulphonaphth-1'-ylazo)-2-naphthol. | Reddish-brown. |
| 40 | ----do---- | ----do---- | 2-acetylamino-7-(2'-hydroxy-5'-nitrophenylazo)-8-naphthol-6-sulphonic acid. | Dark brown. |
| 41 | 1-phenyl-3-methyl-4-(2'-hydroxy-5'-chlorophenyl-azo)-5-pyrazolone. | Ethylamine | 1-(4'-aminophenyl)-3-methyl-4-(2''-hydroxy-5''-chloro-3''-sulphophenylazo)-5-pyrazolone. | Orange. |

What we claim is:

1. An improved process for the manufacture of the 1:2-cobalt complexes which, in the form of the free acids, are represented by the formula:

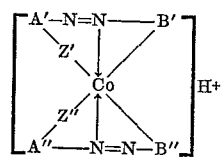

wherein

A' and A'' each independently represent a radical selected from the group consisting of phenylene and naphthalene;

Z' and Z" which are attached to A' and A" respectively in ortho position to the azo group are independently selected from the class consisting of —O— and —COO—;

B' and B" each independently represent a radical of a coupling component selected from the group consisting of phenol, naphthol, acylacetarylamide and 5-pyrazolone, the cobalt atom being attached to B' and B" through the oxygen atoms which are situated in ortho position to the coupling positions; and provided that at least one of A', Z' and B' is not identical with A", Z" and B" respectively; which comprises reacting a 1:1-cobalt complex of the formula:

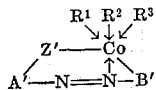

with a metallisable azo compound of the formula:

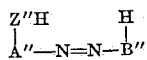

wherein A', A", B', B", Z' and Z" have the meanings stated and $R^1$, $R^2$ and $R^3$ are each selected from the class consisting of ammonia and a monoamine selected from the group consisting of primary and secondary alkylamines, primary and secondary arylamines and heterocyclic compounds selected from the group consisting of pyridine, piperidine, isoquinoline, quinoline, $\beta$-picoline, morpholine and $\gamma$-picoline, the coordinate bonds which link the cobalt atom to $R^1$, $R^2$ and $R^3$ being bonded to the nitrogen atoms present in $R^1$, $R^2$ and $R^3$.

2. Process as claimed in claim 1 wherein the reaction is carried out at a pH between 7.0 and 9.0.

3. Process as claimed in claim 1 wherein the reaction is carried out in the presence of active carbon.

4. Process as claimed in claim 1 wherein one of the 1:1-cobalt complex and the metallisable azo compound contains a single sulphonic acid group.

References Cited

UNITED STATES PATENTS 2,871,233  1/1959  Pfitzner et al. _____ 26—145 X

FOREIGN PATENTS 612,466  1/1961  Canada.
830,970  3/1960  Great Britain.

FLOYD D. HIGEL, *Primary Examiner.*